(12) United States Patent
Brungart et al.

(10) Patent No.: US 7,482,951 B1
(45) Date of Patent: Jan. 27, 2009

(54) AUDITORY ATTITUDE INDICATOR WITH PILOT-SELECTED AUDIO SIGNALS

(75) Inventors: Douglas S. Brungart, Bellbrook, OH (US); Brian D. Simpson, Centerville, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 313 days.

(21) Appl. No.: 11/543,280

(22) Filed: Sep. 25, 2006

Related U.S. Application Data (60) Provisional application No. 60/800,560, filed on May 8, 2006.

(51) Int. Cl.
*G01C 23/00* (2006.01)
*G08B 23/00* (2006.01)
*G01C 21/00* (2006.01)

(52) U.S. Cl. .................. 340/975; 340/970; 340/974; 340/976; 340/963

(58) Field of Classification Search .................. 340/975, 340/974, 970, 976, 963
See application file for complete search history.

(56) References Cited

U.S. PATENT DOCUMENTS 5,486,821 A * 1/1996 Stevens et al. .............. 340/970

| | | | |
|---|---|---|---|
| 2003/0146853 A1* | 8/2003 | Bolduc | 340/974 |
| 2004/0059472 A1* | 3/2004 | Hedrick | 701/3 |
| 2004/0189492 A1* | 9/2004 | Selk et al. | 340/973 |

* cited by examiner

*Primary Examiner*—Jeff Hofsass
*Assistant Examiner*—Jack Wang
(74) *Attorney, Agent, or Firm*—AFMCLO/JAZ; Richard A. Lambert; Jeffrey R. Moore (57) ABSTRACT

An auditory attitude indicator for aircraft that includes an audio source providing an audible signal, a' stereo headset with a left side and a right side, an aircraft avionics system that provides at least aircraft pitch data and roll data to an audio processor unit. The audio processor unit includes at least one lookup table of coefficients corresponding to a plurality of possible aircraft pitch and roll orientations and at least two selectable multipoint finite impulse response filters. The first selectable multipoint finite impulse response filter having a first coefficient selected by the audio processing unit from the lookup table based upon the aircraft pitch data and roll data for varying the audible signal to the stereo headset left side. The second selectable multipoint impulse response filter for varying the audible signal to the stereo headset right side having a second coefficient selected by the audio processing unit from the lookup table based upon the aircraft pitch data and roll data.

19 Claims, 3 Drawing Sheets

AUDITORY ATTITUDE INDICATOR WITH PILOT-SELECTED AUDIO SIGNALS

The present application claims priority of U.S. provisional application 60/800,560 fled May 8, 2006, which is hereby incorporated by reference in its entirety.

RIGHTS OF THE GOVERNMENT

The invention described herein may be manufactured and used by or for the Government of the United States for all governmental purposes without the payment of any royalty.

BACKGROUND OF THE INVENTION

The invention relates to an additional source of information about aircraft orientation provided to a pilot's auditory senses.

One cause of aviation accidents is spatial disorientation. Spatial disorientation occurs when pilots receive conflicting or misleading information from their visual vestibular and proprioceptive sensory systems. This may cause them to become confused about their physical orientation relative to the earth. This conflicting information is often so compelling that it causes pilots to question or even ignore their flight instrumentation and choose instead to fly on the basis of their own intuition about the true orientation of the aircraft. Sadly, such decisions may lead to tragic consequences.

Many spatial disorientation accidents are the result of vestibular illusions that cause the pilot to feel that the plane is in a different orientation than it actually is. For example, the oculogravic illusion is one common vestibular illusion that results when there is a change in linear acceleration. Linear acceleration produces a pitch up illusion while linear deceleration produces a pitch down illusion. This can result in a fatal accident when after a night take off and while still accelerating, the pilot falsely senses an excessive pitch angle and compensates with an unnecessary pitch down stick input resulting in impact with the ground.

The "leans" is another common vestibular illusion that is occurs when the pilot is in a prolonged turn. During the turn, the vestibular organs adapt to the point that they register the angle of bank used during the turn as being vertical. When the plane rolls to wings level to terminate the turn the pilot may perceive this rotation as a bank and turn in the opposite direction. This may cause pilots to lean in an attempt to assume what they think is a vertical posture. The leans may also occur when the pilot performs very slow roll to the left that does not stimulate the vestibular apparatus and then rolls rapidly to the right to level flight. Such a maneuver may generate the false impression that the plane has only rolled to the right.

One way to counter the effects of spatial orientation may be to provide pilots with an additional source of information about aircraft orientation that does not depend exclusively on the visual artificial horizon indicator currently used in a typical aircraft cockpit. Preferably, this redundant information should be presented to a non-visual modality to counter the visual-vestibular illusions such as the oculogravic illusion and the oculogyric illusions that can impair a person s ability to interpret visual information while under linear or rotational acceleration. Consequently, a number of researchers have proposed the use of a rudimentary artificial auditory artificial horizon to provide pilots with information about the pitch and roll of the aircraft through the manipulation of an auditory signal presented to the pilot through stereo headphones.

De Florez in "True Blind Flight" published in the Journal of the Aeronautical Sciences, 3, 168-170, 1936, used a continuous tone signal presented over headphones to provide two orientation cues to the pilot. The rate of turn of the aircraft was indicated by increasing the level of the tone in one ear and delaying the phase of the tone in the opposite ear thus changing the apparent left right location of the tone. The airspeed of the aircraft was indicated by increasing or decreasing the pitch of the tone. These audio cues were somewhat successful and the investigators reported that it was possible to fly an aircraft in a stable manner for more than 40 minutes while blindfolded solely on the basis of these cues.

However, they also noted that these tone based cues were fatiguing to the ear and suggested that a better alternative might be to base the cues on a broadcast radio signal that might be more appealing for the pilot to listen to for long periods of time. They suggested using interaural amplitude cues to manipulate the apparent left right position of the broadcast radio signal to indicate the rate of turn of the aircraft and using low frequency amplitude modulations of the radio signal to convey information about the rate of climb or dive of the aircraft.

T. W. Forbes at Harvard University conducted a number of experiments further exploring the use of an auditory attitude indicator in flight. One configuration published in The Journal of the Aeronautical Sciences, "Auditory Signals for Instrument Flying," 13, 255-258, 1946 involved a three in one sound source that used a repetitive left right sweeping sound to indicate rate of turn. It also used a variation in the pitch of the tone to indicate bank angle and a variation in the interruption rate of the tone, causing a putt-putt like sound to indicate the airspeed of the aircraft. This configuration was not tested in flight but it was shown that it may be used to maintain a level flight pattern in a ground based trainer.

Lyons, Gillingham, Teas and Ercoline described an Auditory Orientation Instrument (AOI) in "The Effects of Acoustic Orientation Cues on Instrumant Flight Performance in a Flight Simulator," Aviation, Space and Environmental Medicine, 1990, 61, 699-706. In one example, the AOI provided acoustic representations of three flight parameters. The first was airspeed, which was represented by the frequency of a square wave signal that increased with increasing velocity. Second was bank angle, which was indicated by a left right intensity panning of the sound. Third was vertical velocity, which was indicated by amplitude and modulating the envelope of the square wave that repeated crescendos indicating an increase in altitude and repeated decrescendos indicating a decrease in altitude. These audio cues were found to increase the pilot s ability to maintain a steady airspeed altitude and bank angle when no visual cues were present but not up the level of performance achieved when visual cues were available.

More recently Grohn, Lokki, and Takala (published in Proceedings of the International Conference on Auditory Display (ICAD), Syndey Australia Jul. 6-9, 2004 (Grohn, Lokki, and Takala) have discussed the use of an auditory attitude indicator for maneuvering through a virtual environment with a 6-degree of freedom flight model. This attitude indicator was based on a 3-D audio display that used Head-Related Transfer Functions (HRTFs) to manipulate the apparent locations of sounds presented to the listener over headphones. In order to determine where to place the virtual sound in their attitude display Grohn Lokki and Takala relied on what they called a ball on a plate metaphor. In this metaphor, the apparent direction of the sound source was determined by the downward direction a ball would roll if it were located on a plate with the same attitude orientation as the operator's vehicle.

In one example, Grohn, Lokki, and Takala reported using three additional cues to provide the operator with additional information about the amount of tilt in the aircraft attitude. These include a gain cue, where the level of the pulsed pink noise increased with the amount of tilt and the pulsed noise was inaudible when the operator was level. A pitch cue, where a narrow band noise was added to the stimulus with the center frequency of the noise varying from 50 Hz to 2 kHz as the amount of tilt increased. A rate cue where the pulse rate of noise increased from 0.7 Hz when the operator was level to 8 Hz when the operator was fully tilted. These three conditions were tested in a virtual flight task. All three were found to result in lower pitch and roll errors than those obtained in a visual only control condition with the same visual cues and but no auditory horizon cue. Minimal difference in performance was found between the three audio conditions but the gain cue condition was preferred because it was the only one where the pulsed noise sound disappeared when the operator was in a level orientation. The subjects considered the other conditions to be annoying because they resulted in pulsed noise sounds even when the operator was flying straight and level.

The previously described systems have not adequately addressed the requirements necessary to make an auditory attitude indicator practical for everyday use in actual aircraft. In one example, Grohn, Lokki, and Takala provided a pitch cue that was based on the spectral elevation cues that naturally occur in the Head Related Transfer Functions (HRTFs) of human listeners. Specifically, their system used HRTFs to place a virtual sound source in the direction that a ball would roll if it were tilted with the same azimuth as the aircraft. Thus, a downward pitch would result in a virtual sound source located in front of the listener and an upward pitch would result in a sound source located behind the listener. However, prior research has shown that it is very difficult to distinguish between sound sources located at the same lateral angle in front and behind the head. Such sources produce nearly identical binaural cues and thus are said to fall on the cone of confusion with respect to the listener. This is discussed in "The role of head movements and vestibular and visual cues in sound localization," The Journal of Experimental Psychology, 27, 339-368, 1940. Thus, the listener might easily confuse upward and downward pitch angles in the Grohn, Lokki, and Takala system.

All documentation referenced within this application is herein incorporated by reference.

SUMMARY OF THE INVENTION

The auditory attitude indicator for aircraft that includes an audio source providing an audible signal, an aircraft avionics system that provides at least aircraft pitch data and roll data to an audio processor unit. The audio processor unit includes at least one lookup table that selects the predefined coefficients for two multipoint finite impulse response filters (one for the left ear and one for the right ear) corresponding too the current values of the aircraft pitch data and the aircraft roll data. Each filter provides data to one designated left or right side of a stereo head set. The selectable multipoint finite impulse response coefficients are designed to vary with the current pitch of the aircraft in such a way to generate an audible pitch orientation signal to either the left or right side of a stereo head set. The selectable multipoint finite impulse response filter are also designed to vary with the current roll of the aircraft coefficients of the lookup table in conjunction with the aircraft roll data to generate an audible roll orientation signal. The auditory attitude indicator for aircraft also includes an aircraft intercom system operatively connected to the audio processor unit.

The aircraft intercom system provides intermittent audio communication input through the audio processor unit such that the optional audible signal, the audible pitch orientation signal, the audible roll orientation signal and the intermittent audio communication input are combined by the audio processor unit to provide auditory attitude information about the aircraft. This attitude information is expected to increase the situational awareness of the pilot and decrease the probability of a mishap due to slow onset spatial disorientation during instrument flight.

It is an object of the present invention to provide audio information about the pitch and roll of an aircraft. It is a further objective of the present invention that the audio information have an intuitive "anchor point" allowing the user to easily determine when the aircraft is in within the boundaries of straight and level flight as defined for that particular aircraft.

It is a further objective that the audio indicator be based on a sound source that will not cause audio fatigue for the listener.

DETAILED DESCRIPTION

There is little reason to believe that any pilot would want to use an auditory horizon cue unless that cue is based on sound that is generally pleasant to listen to and minimally annoying. The present invention is designed to provide the auditory attitude indicator in such a way that it can be applied to any arbitrary audio signal that the pilot might select to listen to for extended periods on a cross-country flight. Preferably, the auditory attitude indicator may be superimposed on top of any kind of user selected auditory entertainment. Pilots may view this as a benefit rather than an annoyance and the likelihood that it would actually be used it in practice may be dramatically higher than for displays in the prior art that have been based on tones, noises, square waves, or other abstract aesthetically unpleasant sounds.

The present invention preferably uses a method of indicating aircraft pitch that is based on two types of auditory processing manipulation. These include the interaural correlation of the stimulus that affects the apparent width of the auditory image and introducing a repetition pitch into the stimulus. This stimulus produces the illusion of a pitch signal even when the source material does not contain significant energy at the fundamental frequency of the apparent pitch. This combination of cues is designed to represent a more robust and intuitive way to add pitch information to an arbitrary audio stimulus than any other currently existing method and it does so in a way is unlikely to significantly impair the auditory comfort of user over long periods of continuous listening. The present invention may also use a variation of left right amplitude panning to indicate the bank angle of the aircraft coupled with interaural time delay information. An auditory attitude indicator preferably focuses on replicating the functionality of the artificial horizon and thus preferably provides aircraft pitch and roll information rather than turn angle and airspeed information.

Figure 1:
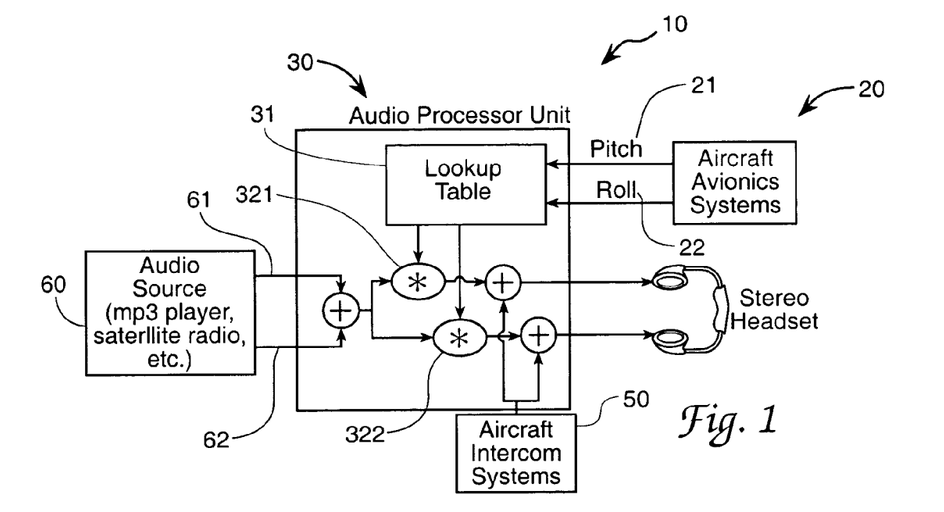
FIG. 1 is of a block diagram of on embodiment of the present invention.

FIG. 1 is a block diagram of the present invention, an auditory attitude indicator 10 for aircraft. The auditory attitude indicator 10 includes an audio processor unit 30, an audio source 60 providing an optional audible signal 61,62, and an aircraft intercom system 50. The auditory attitude indicator 10 further includes an aircraft avionics system 20 that provides at least aircraft pitch data 21 and roll data 22, and an aircraft intercom system 50.

The audio processor unit 30 including at least one lookup table 31 of coefficients corresponding to at least pitch data and roll data for at least two selectable multipoint finite impulse response filters: those corresponding to a right ear input 321 and those corresponding to a left ear input 322; the audio processor unit 30 is designed to add auditory attitude information to any arbitrary audio input selected by the user. In FIG. 1, an audio input is from the audio source 60 as audible stereo signal 61, 62. Alternatively, the audio source 60 may provide a mono signal. This input may come from any audio source 60 means known in the art including AM/FM radio, MP3 player, CD, tape, satellite radio, etc. The audio source 60 may alternatively be provided from a compressed file format such as MP3. The left and right outputs of this stereo signal 61, 62 are preferably added together and processed by one or more selectable multipoint finite impulse response filters. FIG. 1 shows two multipoint finite impulse response filters 321, 322. Preferably, the multipoint finite impulse response filters are selectable 128 point finite impulse response filters.

The response of the filters is designed to be determined by the coefficients selected from the lookup table 31. The lookup table may be one table or more than one, depending upon the specific implementation. The look up table 31 coefficients used by the multipoint finite impulse response filters 321, 322 are selected according to the pitch and roll orientations of the aircraft. For each possible combination of aircraft pitch and aircraft roll, a different set of finite impulse response filters is stored in the lookup table. These filters are designed according to the procedures outlined below. A pitch orientation (pitch data 21) and roll orientation (roll data 22) is provided to the audio processor unit 30 by the aircraft avionics systems 20. The pitch and roll orientation may be provided by any means known in the art.

Preferably the pitch and roll orientation is provided by a real time interface. Suitable interfaces include an RS-232 serial interface. The selectable multipoint finite impulse response filters 321, 322 uses the pitch corresponding coefficients of the lookup table 31 in conjunction with the aircraft pitch data 21 aircraft roll data 22 to generate an audible pitch orientation signal and a roll orientation signal. In order to provide a useable system in practice, the audio processor unit 30 preferably mixes the audible mono or stereo signal 61, 62 of the audio source 60 with the aircraft intercom system 50 providing intermittent audio communication input as needed to maintain aircraft radio communications. This communication may be from any source. In one example the communications may be from a control tower, another aircraft, internal to the aircraft or a combination thereof.

The intermittent audio communication input may be provided by any means known in the art. One example includes a mixing device for the input. Preferably a more sophisticated system is used in which the audible mono or stereo signal 61, 62 is attenuated, muted or interrupted whenever the intermittent audio communication input voice activity is present. This would mitigate the possibility that the audible stereo signal 61, 62 would interfere with normal radio communications.

More preferably, a system is used in which the audible pitch orientation signal and a roll orientation signal is attenuated, muted or interrupted whenever the intermittent audio communication input 51 voice activity is present. This would further mitigate the possibility that the audible stereo signal 61, 62 would interfere with normal radio communications.

The optional audible signal is processed by the audio processor unit to add audible pitch orientation information and the audible roll orientation information to provide auditory attitude information about the aircraft, and then combined with the intermittent audio communication input. The resulting mixed signal may then played out to the pilot via a standard stereo headset system, preferably in stereo. The audio processing unit may be enabled by software on a standard general purpose personal computer such as a windows based laptop, Mac. Alternatively, the audio processing unit may be integrated into the aircraft onboard electronics. In one embodiment, the audio processing unit may be implemented by a software system. One suitable software system may be a modification of the Sound LAB SLAB open source software package developed by NASA to produce a real time spatialized audio display as disclosed in "SLAB: a Software-Based Real-Time Virtual Acoustic Environment Rendering System." Published in *Proceedings of the International Conference on Auditory Display ICAD*, Espoo Finland, Jul. 29-Aug. 1, 2001.

The software system may be designed to process an audio signal with a left and right point FIR filters that may be switched in real time in response to the azimuth and elevation of the listener's head. FIR filters finite impulse response (FIR) filters are a type of digital filter. It is 'finite' because its response to an impulse ultimately settles to zero. This is in contrast to infinite impulse response filters which have internal feedback and may continue to respond indefinitely. The impulse refers to the fact that the FIR coefficients represent the time-domain response of the system when it is excited by an "impulse" input signal with unity energy and an infinitely short (very very short) duration. This may alternatively be described as excited by an "impulse" digital input signal consisting of a single sample with a magnitude of 1 followed by 128 zeros.

In order to modify the software to be an attitude indicator the FIR filters may be changed from the set of azimuth and elevation dependent Head Related Transfer Functions (HRTFs) typically used in a virtual audio display such as the SLAB system. HRTFs capture the direction-dependent changes that occur in the frequency response of the signal heard at a listener's ear as a sound source varies in azimuth and elevation around the listener. In the auditory horizon indication system, the HRTFs that are normally used for three-dimensional (3D) audio displays are replaced with a set of pitch and roll dependent Attitude Indication Transfer Functions (AITFs). AITFs are designed to provide an auditory horizon cue to the pilot of the aircraft. In the SLAB embodiment of the system, the AITFs serve as the finite impulse response filters (321 and 322 in FIG. 3) that vary with the pitch and the roll of the system. The SLAB software itself serves as the lookup table that selects the appropriate AITFs corresponding to the current pitch and roll values of the aircraft, and performs the convolution of the audio input signal (61, 62) with the left and right ear AITFs for that location. AITFs are preferably generated for normalized pitch and roll values. Pitch and roll combine to give the aircraft attitude.

One important design parameter in an auditory attitude indicator is the functional relationship between the physical change in the aircraft attitude and the size of the resulting changes in the auditory cues present in the auditory indicator. Although some acrobatic aircraft can operate at virtually any pitch and roll values, most general purpose aircraft are restricted to a limited range of pitch and roll for normal safe operation. This range is sometimes referred to as the aircraft flight envelope. However, the size of the range can vary significantly across different aircraft types and perhaps different aircraft missions such as crop dusting versus passenger ferrying. Therefore, it is preferable to refer to aircraft attitude in terms of a non-dimensional normalized roll value $\beta$ and the non-dimensional normalized pitch value $\rho$. Under this convention $\beta$ is the normalized roll of the aircraft with a $-1$ indicating the maximum acceptable roll angle to the left and $+1$ indicating the maximum acceptable roll angle to the right. Similarly, $\rho$ is the normalized pitch of the aircraft with a $-1$ indicating the maximum acceptable downward pitch and a $+1$ indicating the maximum acceptable upward pitch. This normalization is arbitrary and many normalizing schemes for the values would likely work. The mapping between the actual pitch and roll values of the aircraft and the normalized parameters $\rho$ and $\beta$ in the auditory display is arbitrary. Further, a non-linear mapping may be required to achieve an audio display with the desired sensitivity to changes in attitude across the entire flight envelope of the aircraft.

Figure 2:
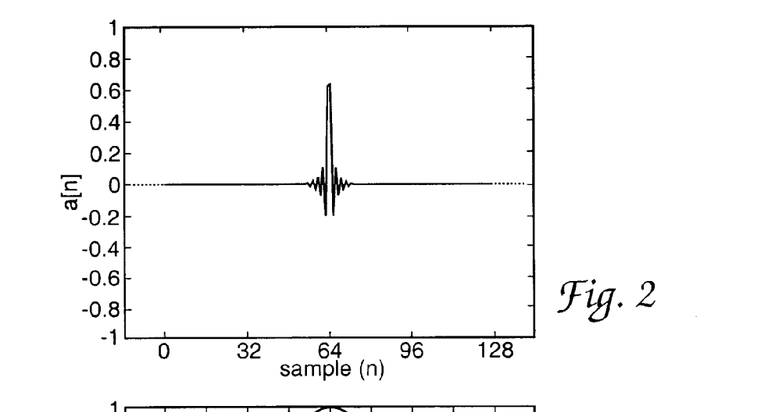
FIG. 2 is one example of a unity-gain all-pass filter a[n] for use as a basis for creating Attitude Indication Transfer Functions.

The Attitude Indication Transfer Functions (AITFs) may be created by modifying the point symmetric unity-gain all-pass impulse function a[n] shown in FIG. 2. This baseline filter represented by the time domain coefficients a(n) may be converted into the frequency domain representation $A[\omega_k]$ with a discrete Fourier transform (DFT). The individual coefficients of $A[\omega_k]$ may be modified with multiple different pitch related cues. Preferably, this may be performed with at least three different pitch related cues.

One spatial cue that may be added to the AITFs is a filtering function that emphasizes the high frequencies of the AITFs associated with downward pitch and the low frequencies of the AITFs with upward pitch. This filtering can be accomplished changing the DFT coefficients of the AITF to introduce a spectral slope in the frequency response of the filter that changes a constant number of decibels with each factor of two (octave) change in the frequency of the input signal. The spectral slope preferably ranges from about 0 dB per octave for a level aircraft to about $-6$ dB per octave for an aircraft at the maximum safe upward pitch. The spectral slope preferably ranges from about 0 dB per octave for a level aircraft to about $+6$ dB per octave for an aircraft at the maximum safe downward pitch. The spectral slope may alternatively range from about 0 db to about 8 db per octave for an aircraft at the maximum safe upward or downward pitch. In one embodiment, this relationship may be implemented by multiplying each DFT coefficient of $A[\omega_k]$ by $10_2^{(\log k * 6 * \rho)/20}$.

A second spatial cue may be added to the AITFs. This spatial cue may be a periodic spectral emphasis designed to create an apparent repetition pitch in the auditory attitude information of the audio signal. This periodic spectral emphasis may increase the magnitude of specific coefficients of $A[\omega_k]$. For example the periodic spectral emphasis may be used to increase the magnitude of every third DFT coefficient of $A[\omega_k]$ in the pitch-down condition and every seventh DFT coefficient of $A[\omega_k]$ in the pitch-up condition by a factor of $1+9|\rho|$ This may create a linear ramp in the amplitude of the enhanced periodic coefficients that increases very rapidly a low pitch values and asymptotes to a maximum amplitude boost of about 10 dB and preferably more than 15 dB at the maximum pitch value of the aircraft. One possible advantage of using a repetition pitch in addition to a simple low or high pass filter, is that the repetition pitch will produce the illusion of a consistent pitch value at the repetition rate (sometime referred to as the "missing fundamental"). This may occur even if the processed audio signal only contains energy in a limited range of frequencies that do not include the harmonic frequency. In this implementation, the boosting of every third coefficient creates a repetition pitch of approximately 1000 Hz in the pitch-up condition, given a system sampling rate of about 44100 Hz. Boosting every seventh creates a repetition pitch of approximately 2400 Hz in the pitch-down condition. The use of a high or low pitched cues based on repetition pitch is more preferable because it can impose the illusion of a consistent pitch cue on an arbitrary signal even when that signal contains no usable energy at the fundamental frequency of the harmonic. Thus, this type of cue can be used to impose the illusion of a low pitched tone even on a music signal that happens to have only high frequency energy during the audio source input (musical track).

An additional cue that may be added to the auditory attitude information of the audio signal. The AITFs may include an interaural difference cue designed to decorrelate the left and right ear signals for aircraft attitudes above and below the horizontal plane. In order to further differentiate between the audio cues present in the signal in pitch-up and pitch-down attitudes a different method of decorrelation is preferred for each condition. Decorrelation is preferred in the present invention because it may be implemented relatively easily and can be detected in a broad range of audio signals. In addition, Decorrelation may be used to distinguish between straight and level flight, which results in a compact sound image and upward or downward pitched flight that results in a broad and diffuse sound image. Further, decorrelation is designed to cause minimal interference with the left right amplitude panning cue used for bank angle and for many people decorrelation does not significantly impair the enjoyment of an auditory entertainment signal such as music. Thus, differential use of interaural level based decorrelation for downward pitch and interaural-phase-based decorrelation for upward pitch may be advantageous. Decorrelation takes advantage of subtle perceptual difference between these two types of cues.

In the pitch-up condition, the decorrelation may be implemented by introducing a rapidly changing frequency dependent interaural phase difference into the auditory attitude information of the audio signal. In the pitch-down condition, the decorrelation may alternatively be implemented by rapidly changing frequency dependent interaural level difference into the auditory attitude information of the audio signal.

The interaural phase decorrelation may be implemented by multiplying the discrete Fourier transform (DFT) coefficients of the left ear AITF $H[\omega_k]$ by e to the power of $0.5\pi|\rho|(-1)^k j$ or $e^{}(0.5\pi|\rho|(-1)^k j)$. The DFT coefficients of the right ear may be multiplied according to AITF $H[\omega_k]$ by e to the power of $-0.5\pi|\rho|(-1)^k j$ or $e^{}(-0.5\pi|\rho|(-1)^k j)$. This manipulation may result in interaural correlation coefficients ranging form $-1$ for pitch values equal to $p_{max}$ to $+1$ for pitch values of about 0.

Figure 3:
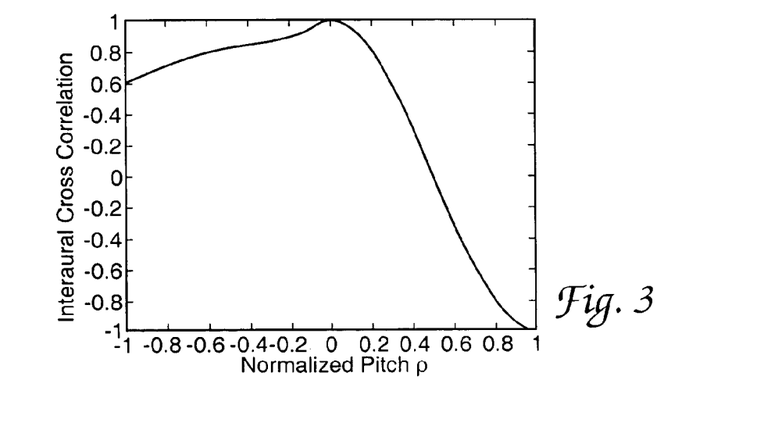
FIG. 3 is one example of an interaural correlation coefficient for the Attitude Indication Transfer Functions as a function of normalized pitch $\rho$.

FIG. 3 illustrates an Interaural Cross Section on the y-axis and a Normalized Pitch p on the x-axis for a normalized implementation of $p_{max}=10$. The designed perceptual effect of this decorrelation cue is a systematic change in the apparent width of the auditory stimulus from a compact, punctuate source for a pitch of 0 degrees (0°) to a diffuse, broad sound source for a pitch of ±10 degrees. Further explanation of the perceptual impact of interaural correlation on the apparent source width of an audio signal is available in "Spatial Hearing" by J. Blauert, published by MIT Press in 1983.

The interaural level decorrelation may be implemented by manipulating the interaural level decorrelation rather than the interaural phase decorrelation by multiplying the DFT coefficients of the left ear AITF $H[\omega_k]$ by 10 to the power of $|\rho|(-1)^k$ or $10^{}(|\rho|(-1)^k)$. The DFT coefficients of the right ear may be multiplied according to AITF $H[\omega_k]$ by 10 to the power of $-|\rho|(-1)^k$ or $10^{}(-|\rho|(-1)^k)$. Preferably, these equations are not applied to the coefficients where the overall intensity may be enhanced to produce the repetition pitch cue in the stimulus. In the present example, every seventh coefficient in the DFT would not have these equations applied.

Possibly because interaural correlation is more sensitive to phase differences than to level differences, this manipulation may not result in as large a change in the interaural correlation coefficient as the phase based decorrelation cue. As shown in FIG. 3, the Interaural Cross Correlation may only decrease to approximately 0.6 when the pitch is set and the largest negative value is (−1). However, the perceptual effect of this interaural level decorrelation is similar to that experienced for interaural phase decorrelation. The perceptual effect is designed to be a systematic broadening in the apparent width of the stimulus with decreasing aircraft pitch.

The internal level decorrelation manipulation based on rapidly varying interaural level differences may also result in an apparent high pitched tonal component which is why the level decorrelation may be paired with the higher repetition pitch employed in the pitch-down condition.

Figure 4A:
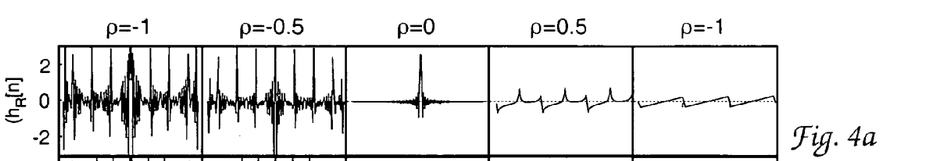
FIG. 4a is an example of time domain impulse responses for the right ear Attitude Indication Transfer Functions (AITFs).
Figure 4B:
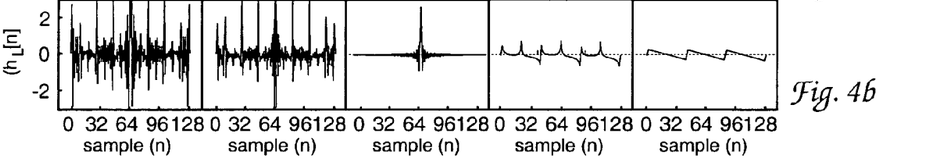
FIG. 4b is an example of time domain impulse responses for the right ear AITFs.

The time-domain coefficients of the AITF filters used to process the arbitrary auditory input are generated by taking the Inverse Discrete Fourier Transform of the DFT coefficients of the allpass filter modified with the three transformations outlined above. Namely, the low or high frequency emphasis related to pitch; the periodic emphasis of the filter coefficients to introduce an apparent repetition pitch; and the rapidly varying interaural phase or amplitude differences of the coefficients related to pitch. In order to ensure that the resulting AITF coefficients are real numbers, these transformations are applied only to the first half of the DFT coefficients of the allpass filter. The second half of the DFT coefficients of the AITF are derived from the first half of the DFT coefficients by imposing the assumption that the full DFT is complex-conjugate-symmetric. The resulting DFT coefficients are then converted back into the time domain with the inverse DFT. The coefficients of the allpass filter may then be equalized in level. This may be achieved by convolving each filter with a multipoint filter designed to match the frequency content of a sample of pop music and determining the proper scaling value to equalize the root mean squared (RMS) output energy for this music waveform. FIGS. 4a and 4b identify some examples of possible AITFs for an implementation with a maximum pitch of 10 degrees. FIGS. 4a and 4b show the time domain impulse responses for the left and right ear AITFs. At extreme positive pitches, the right ear transfer functions may be simply inverted versions of the left ear transfer functions. This produces the extreme interaural cross correlation value of about −1. The positive pitch AITFs in FIGS. 4a and 4b appear much lower in magnitude than the negative pitch AITFs. They may have a low frequency emphasis and be adjusted to compensate for the relatively greater amount of energy that typically occurs in the low frequency range of pop music.

Figure 4C:
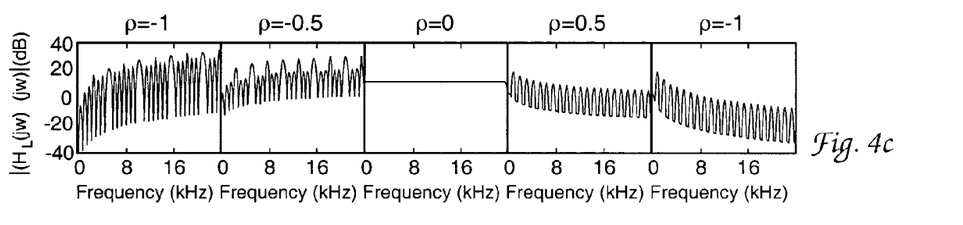
FIG. 4c is an example of one possible magnitude of the frequency response for the left ear transfer functions.

FIG. 4c shows the one possible magnitude of the frequency response for the left ear transfer functions. The periodic ripples related to the repetition pitch added to the AITFs with a greater spacing between the ripples for the higher frequency repetition pitch that occurs at positive attitudes.

Figure 4D:
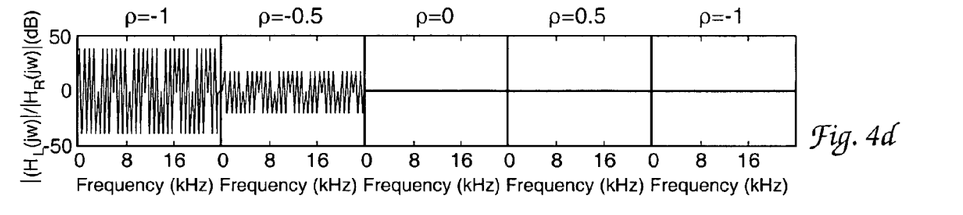
FIG. 4d is an example of one possible interaural level difference between the left and right ear filters at each frequency.

FIG. 4d shows one possible interaural level difference between the left and right ear filters at each frequency. At negative pitch values, there may be a rapidly alternating interaural level difference of up to about ±40 dB, and preferably up to about ±60 dB. However, at positive pitch values there may be little or no interaural level difference at any frequency.

Figure 4E:
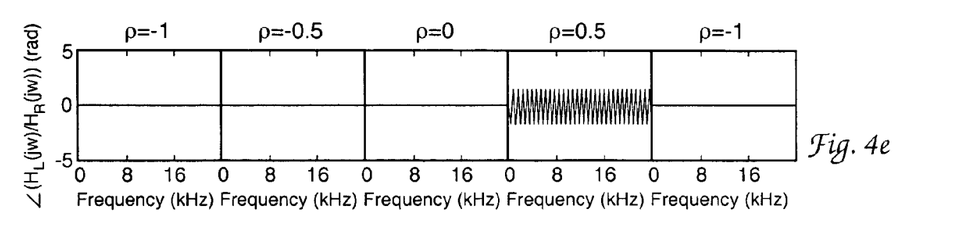
FIG. 4e is an example of one possible interaural phase difference between the left and right ears.

FIG. 4e shows one possible interaural phase difference between the left and right ears. The graphs in FIG. 4e show little or no interaural phase difference at negative pitch values. The graph shows a rapidly varying interaural phase of ±π radians when the pitch is about equal to about half its maximum value (and interaural correlation is about zero (0)). The graphs show a constant interaural phase difference value of pi radians when the pitch is about equal to its maximum value (and the correlation coefficient is −1).

As described in this embodiment there may be a general low frequency emphasis for positive attitude values and a high frequency emphasis for negative attitude values.

Another component of the AITFs may be the interaural level difference cue that may be added to provide an indication of the roll value of the aircraft. This level difference cue may be implemented by attenuating the AITF in the ear in the direction of the roll by a constant, frequency independent scale factor of $48 \sin((\beta\pi)/3)$ dB. The left and right ear AITFs may then be normalized to have a constant total power independent of the bank angle of the aircraft such that $\Sigma_k h_L(n)^2 + \Sigma_k h_R(n)^2 = C$. Where C is a constant for all possible pitch and roll values of the aircraft.

The effectiveness of the proposed invention for conveying attitude information to pilots has been tested both in the laboratory and in flight. The results of which may be found in "Auditory Attitude Indicator with Pilot-Selected Audio Signals," published by Simpson, Brungart, et al. in the proceedings of the Human Factors and Ergonomics Society 49th meeting, 2005, pp 1602-1606.

Figure 5A:
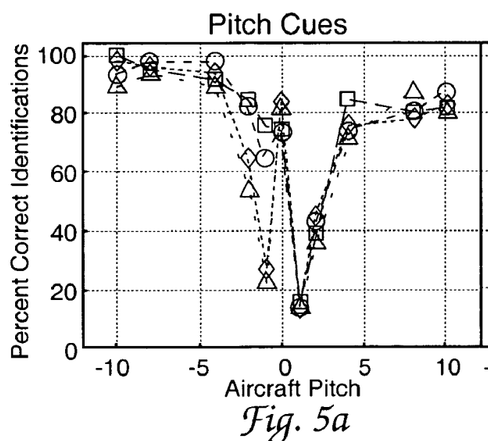
FIG. 5a is an example of nonlinear mapping between pitch $\rho$.
Figure 5B:
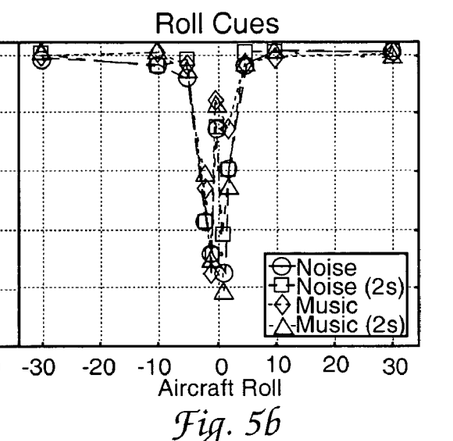
FIG. 5b is an example of mapped results from a laboratory experiment.

FIGS. 5a and 5b show nonlinear mapping between true aircraft pitch and normalized pitch ρ to equate the detectability of upward and downward pitch angles in the auditory attitude indicator. FIG. 5a shows the nonlinear mapping between pitch ρ and FIG. 5b shows possible mapped results from a laboratory experiment. In one embodiment, preferably the use of a non linear mapping between actual aircraft pitch and the normalized pitch ρ that would produce approximately the same sensitivity to upward and downward changes in the pitch of the aircraft. This non-linear mapping between aircraft pitch and normalized pitch ρ is shown in FIG. 5a. FIG. 5b shows possible overall pitch detection scores experimentally derived from a laboratory experiment plotted with the preferred mapping between aircraft pitch and the normalized pitch value. Note that overall pitch detection may be substantially equivalent for both upward and downward pitch deviations. The present invention, designed to provide pitch and roll information within a user-selected signal. The user signal helps mitigate the fatigue of other systems.

Providing pitch and roll information with a user selected signal has significant advantages. In the present invention, the cues (auditory attitude information) are preferably designed to convey a sense of the orientation of the horizon relative to the plane as opposed to the orientation of the plane relative to the earth. Preferably, the present invention is designed to be analogous to the visual cues that occur on an aircraft visual artificial horizon display. For example, when a plane banks to the right, the horizon becomes higher on the left side than on the right side. In the present invention, such a movement may be conveyed by an increase in the level of the sound in the left ear. The sound is an indicator to the pilot that in order to align the plane with the horizon it will be necessary to roll the aircraft towards the left. When the plane pitches down, the present invention may cause the sound to become perceptually higher in pitch indicating that the nose of the plane is below the horizon. When the plane pitches up, the sound may become perceptually lower in pitch indicating that the nose of the plane is above the horizon. Similarly, a visual artificial horizon displays the horizon moving up when the plane pitches down and moving down when the plane pitches up. The present invention is designed to be more intuitive and useful than previous displays because it conveys to the pilot what action must be taken to restore the plane to straight and level flight.

When the aircraft is within its defined parameter(s) for straight and level flight, the present invention passes through the auditory input signal without modification. Thus the auditory attitude information may be provided only when the aircraft deviates from a predefined and variable boundary condition. These conditions may be defined by the aircraft capabilities, the aircraft flight plan, or a combination thereof.

The present invention may operate as a stand-alone system in the aircraft as depicted in FIG. 1. Alternatively, it may be integrated into the avionics systems, into the navigation systems, into the radio system, and/or into the intercom system. It may also be integrated with a CD player or MP3 player integrated into the plane such that no external audio source is required. In one alternative, the present invention may be integrated with software on a laptop computer such that it may be carried on and off the aircraft at will.

The system may be expanded to a higher audio resolution system. For example, it may be designed to employ more than 128-coefficient FIR filters. Higher coefficient FIR filters may allow more flexibility in the design of the system including the selection of a wider variety of pitches for the repetition pitch and perhaps more robust interaural correlation cues. The system may also be designed to use infinite impulse response filters or other type of signal processing techniques known in the art to implement the interaural correlation and pitch cues. The system may also be adapted to provide information about flight parameters other than the pitch and roll of the aircraft. For example, it may operate in modes that would give the pilot information about deviations from a glide slope on instrument approaches. This information may be in addition to pitch and roll information, or in place of pitch and roll information.

The present invention has been shown and described herein in what is considered a practical and exemplary embodiment. It is recognized, however, that departures may be made there from within the scope of the invention and that obvious modifications will occur to a person skilled in the art.

What is claimed is:

1. An auditory attitude indicator for an aircraft comprising:
   an audio source providing an audible signal;
   a stereo headset with a left side and a right side;
   an aircraft avionics system that provides at least aircraft pitch data and roll data to;
   an audio processor unit including,
      at least one lookup table of coefficients corresponding to a plurality of possible aircraft pitch and roll orientations,
      at least one first selectable multipoint impulse response filter for varying the audible signal to the stereo headset left side,
         the first selectable multipoint impulse response filter having a first coefficient selected by the audio processing unit from the lookup table based upon the aircraft pitch data and roll data,
      at least one second selectable multipoint impulse response filter for varying the audible signal to the stereo headset right side,
         the second selectable multipoint impulse response filter having a second coefficient selected by the audio processing unit from the lookup table based upon the aircraft pitch data and roll data;
      the coefficients selected to generate an audible pitch orientation signal corresponding to the aircraft pitch position and an audible roll orientation signal corresponding to the aircraft roll position;
      an aircraft intercom system operatively connected to the audio processor unit, the aircraft intercom system providing intermittent audio communication input through the audio processor unit and;
   the audible signal, the audible pitch orientation signal, the audible roll orientation signal and the intermittent audio communication input are processed by the audio processor unit to provide auditory aircraft attitude information through the stereo headset.

2. The auditory attitude indicator of claim 1 wherein the audible signal is processed by the selectable multipoint finite impulse response filters of the audio processor unit.

3. The auditory attitude indicator of claim 1 wherein the audible signal has volume and the audio processor unit includes a signal fader that reduces the volume of the audible signal when the aircraft intercom system is providing audio communication input.

4. The auditory attitude indicator of claim 3 wherein the fader eliminates the audible signal, the pitch orientation signal and the roll orientation signal when the aircraft intercom system is providing audio communication input.

5. The auditory attitude indicator of claim 1 wherein the at least one first selectable multipoint finite impulse response filter has at least 128 points and the at least one second selectable multipoint finite impulse response filter has at least 128 points.

6. The auditory attitude indicator of claim 1 wherein the aircraft intercom system audio communication input is from a control tower, another aircraft, internal to the aircraft or a combination thereof.

7. The auditory attitude indicator of claim 1 wherein the auditory aircraft attitude information only changes the audible signal when the aircraft deviates from a predefined and variable boundary condition.

8. The auditory attitude indicator of claim 1 wherein the audible pitch orientation signal is processed using an attitude indication transfer function.

9. The auditory attitude indicator of claim 1 wherein the audible roll orientation signal is processed using an attitude indication transfer function.

10. The auditory attitude indicator of claim 1 wherein the audio source is selected from the group: FM radio, AM radio, satellite radio, compact disk player, or MP3 player.

11. The auditory attitude indicator of claim 1 wherein the audio processor unit includes a computer and software for calculating altitude indication transfer functions (AITFs) based upon the look up table, the pitch data, and the roll data.

12. The auditory attitude indicator of claim 11 wherein the AITFs may include an interaural difference cue designed to decorrelate the audible pitch orientation signal.

13. The auditory attitude indicator of claim 12 wherein the auditory attitude information conveys a horizontal plane orientation relative to the aircraft.

14. The auditory attitude indicator of claim 12 wherein the audible signal is in stereo and wherein the audio processor unit combines the two signals.

15. The auditory attitude indicator of claim 12 wherein the audible pitch orientation signal is created at least in part using at least one periodic spectral emphasis.

16. The auditory attitude indicator of claim 12 wherein the audible pitch orientation signal decorrelation is implemented by introducing a rapidly changing frequency dependent interaural phase difference into the auditory aircraft attitude information, created at least in part by using at least one periodic spectral emphasis.

17. The auditory attitude indicator of claim 12 wherein the audible pitch orientation signal decorrelation is implemented by introducing a rapidly changing frequency dependent interaural phase and intensity differences into the auditory attitude information of the audible signal, created at least in part by using at least one periodic spectral emphasis.

18. The auditory attitude indicator of claim 12 where the roll orientation signal is implemented at least in part by increasing a relative level of the of the auditory aircraft attitude information.

19. The auditory attitude indicator of claim 13 where the auditory aircraft attitude information includes an apparent auditory pitch, the audible pitch orientation signal increases and decreases the apparent auditory pitch based upon the aircraft pitch orientation.

\* \* \* \* \*